United States Patent
Frebourg et al.

(10) Patent No.: US 9,584,853 B2
(45) Date of Patent: Feb. 28, 2017

(54) VISUAL REPRESENTATION OF NAVIGATION FLOWS WITHIN A USER INTERFACE

(71) Applicant: Cisco Technology, Inc., San Jose, CA (US)

(72) Inventors: Olivier Frebourg, Southampton (GB); Paul Harding, Staines upon Thames (GB); Robert Cressey, London (GB); Wenhui Yu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/740,314

(22) Filed: Jun. 16, 2015

(65) Prior Publication Data

US 2016/0373803 A1    Dec. 22, 2016

(51) Int. Cl.
| | |
|---|---|
| *G06F 13/00* | (2006.01) |
| *G06F 3/00* | (2006.01) |
| *H04N 5/445* | (2011.01) |
| *H04N 21/431* | (2011.01) |
| *H04N 21/482* | (2011.01) |
| *H04N 21/442* | (2011.01) |
| *G06F 17/30* | (2006.01) |
| *H04L 12/26* | (2006.01) |

(52) U.S. Cl.
CPC ... *H04N 21/4312* (2013.01); *G06F 17/30386* (2013.01); *H04L 43/045* (2013.01); *H04N 21/44222* (2013.01); *H04N 21/482* (2013.01)

(58) Field of Classification Search
CPC ......... H04N 21/4312; H04N 21/44222; H04N 21/482; H04L 43/045; G06F 17/30386
See application file for complete search history.

(56) References Cited

U.S. PATENT DOCUMENTS

| | | | |
|---|---|---|---|
| 6,470,383 B1* | 10/2002 | Leshem | ................. G06F 11/32 707/E17.116 |
| 7,043,702 B2 | 5/2006 | Chi et al. | |

(Continued)

OTHER PUBLICATIONS

The Guardian; Public Spending Graphic 00511 (2010) Can be seen at: https://eavesca.files.wordpress.com/2013/10/public-spending-graphic-00511.jpg.

(Continued)

*Primary Examiner* — Hunter B Lonsberry
*Assistant Examiner* — Patrick A Ryan
(74) *Attorney, Agent, or Firm* — Samuel M. Katz

(57) ABSTRACT

In one embodiment, a method includes: retrieving data relevant to a first screen of an electronic program guide; generating a graphical user interface using the retrieved data, in which: a first node identifies the first screen; second nodes identify second screens accessed after the first screen, each of the second nodes being positioned to one side of the first node; the first node is connected to each of the second nodes by connectors, each of the connectors pointing towards each of the second nodes and having a width proportional to a volume of navigation flow received by each of the second nodes from the first node; wherein at least one node comprises a visual indication indicating an average time spent by the users on an identified screen of the electronic program guide; and rendering the generated graphical user interface on a display screen of the computing device.

20 Claims, 6 Drawing Sheets

(56) References Cited

U.S. PATENT DOCUMENTS

| | | | |
|---|---|---|---|
| 7,051,029 B1* | 5/2006 | Fayyad | G06F 17/30876 |
| 7,603,373 B2* | 10/2009 | Error | G06Q 30/02 |
| 7,792,844 B2 | 9/2010 | Error et al. | |
| 7,958,189 B2 | 6/2011 | Bernstein | |
| 8,650,492 B1 | 2/2014 | Mui et al. | |
| 2008/0307451 A1* | 12/2008 | Green | G06F 3/0482 |
| | | | 725/25 |
| 2011/0030013 A1* | 2/2011 | Diaz Perez | G06Q 30/02 |
| | | | 725/51 |
| 2014/0280133 A1* | 9/2014 | Dulitz | G06Q 30/0201 |
| | | | 707/736 |
| 2014/0373064 A1* | 12/2014 | Ray | H04N 21/25891 |
| | | | 725/46 |
| 2015/0081701 A1* | 3/2015 | Lerios | G06F 17/30876 |
| | | | 707/736 |
| 2015/0193549 A1* | 7/2015 | Frye | G06F 3/0482 |
| | | | 715/739 |

OTHER PUBLICATIONS jQuery; Circular Countdown (2015) Can be seen at: http://www.jqueryscript.net/images/Attractive-jQuery-Circular-Countdown-Timer-Plugin-TimeCircles.jpg.

Mui, Phil; Introducting Flow Visualization: Visualizing Visitor Flow (Oct. 19, 2011) Can be seen at: http://analytics.blogspot.co.il/2011/10/introducing-flow-visualization.html.

Ourednik, Andre; Le Reseau de Mobilite Valaison (2015) Can be seen at: http://ourednik.info/maps/wp-content/uploads/2012/04/reseauVS5walktrap_simplifiedvsual.png.

Wikipedia; Flow Diagram (2015) Can be seen at: http://en.wikipedia.org/wiki/Flow_diagram.

Wikipedia; Sankey Diagram (2015) Can be seen at: http://en.wikipedia.org/wiki/Sankey_diagram.

* cited by examiner

US 9,584,853 B2

VISUAL REPRESENTATION OF NAVIGATION FLOWS WITHIN A USER INTERFACE

TECHNICAL FIELD

The present disclosure relates generally to data visualization and user interfaces.

BACKGROUND

In the television industry, data visualization tools and applications enable television business operators to easily view data relevant to their subscribers, broadcast media contents, etc. Data visualization applications typically comprise a user interface—including dashboards, metrics, navigation flow diagrams, etc.—enabling a television operator to see and understand how an Electronic Program Guide (EPG) is navigated by end users. The increasing complexity of EPGs has challenged designers of user interfaces for data visualization applications. For example, a common challenge has been to design and implement user interfaces that provide an appropriate balance of information, usability, intuitiveness, control, and functionality, thus promoting a quality user experience.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

In one embodiment, a method implemented on a computing device for visualizing navigation flows within an electronic program guide, includes: retrieving data relevant to a first screen of the electronic program guide, the data identifying a plurality of screens viewed by users of the electronic program guide prior to and/or after the first screen and a volume of navigation flow between each of the plurality of screens and the first screen; generating a graphical user interface using the retrieved data, the graphical user interface comprising a plurality of nodes and a plurality of connectors, in which: a first node of the plurality of nodes identifies the first screen; one or more second nodes of the plurality of nodes identify one or more second screens accessed after the first screen, each of the one or more second nodes being positioned to one side of the first node; the first node is connected to each of the one or more second nodes by one of the plurality of connectors, each of the plurality of connectors pointing towards each of the one or more second nodes and having a width proportional to a volume of navigation flow received by each of the one or more second nodes from the first node; wherein at least one of the plurality of nodes comprises a visual indication, the visual indication indicating an average time spent by the users on an identified screen of the electronic program guide; and rendering the generated graphical user interface on a display screen of the computing device.

Detailed Description of Exemplary Embodiments

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Although the principles of the present invention are largely described herein in relation to a television (TV) broadcast environment and Electronic Program Guides (EPGs), this is an example selected for convenience of presentation, and is not limiting.

Figure 1:
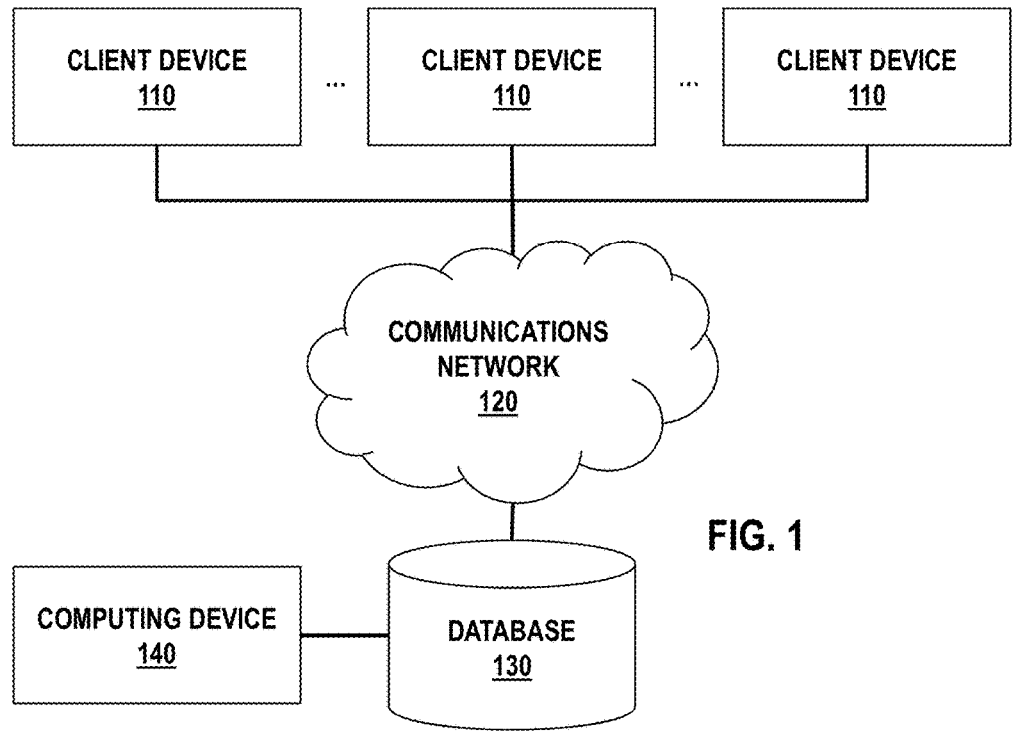
FIG. 1 is a simplified block diagram illustration of a system, constructed and operative in accordance with an embodiment of the present invention.

Reference is now made to FIG. 1, which is a simplified pictorial illustration of a system 100 constructed and operative in accordance with an embodiment of the present invention. The system 100 of FIG. 1 comprises a plurality of client devices 110, a communications network 120, a database 130 and a computing device 140. For the sake of depiction, only three client devices 110 are shown although it will be apparent to those skilled in the art that the system 100 may comprise less or more than three client devices 110.

A client device 110 is a device enabling a user to access different services provided by a media content provider. The client device 110 typically enables a user to view different TV programs and/or services provided by a TV broadcaster and/or platform operator. The client device 110 of FIG. 1 may be for example, but not limited to, a tablet device, a smartphone, a desktop or a portable computer, a set-top box, an Internet-enabled television, a media center PC, or any other suitable device, such as known in the art. Furthermore, the client device 110 typically enables the user to access, browse and navigate through a user interface such as an EPG.

An EPG generally comprises a plurality of pages or screens that can be accessed and browsed by a user. By browsing and navigating through the EPG, the user may, for example, but not limited to, view future TV programs, access detailed information about these future programs, access a video-on-demand (VOD) catalog, select a TV channel, watch a live TV program, access different services or applications, etc. Similarly, any appropriate pointing methods as are known in the art (e.g., but not limited to: mice, eye tracking methods, etc.) as well as direct manipulation by the computing user's finger on a touch screen associated with the client device 110 may be used to input signals for accessing and browsing the EPG.

Communications network 120 may be any suitable communications network enabling the client devices 110 to communicate with the database 130. Communications network 120 may include one or more networks or types of networks capable of carrying communications and/or data signals between the components of client devices 110 and the database 130. For example, communications network 120 may include, but is not limited to, a cable network, an optical fiber network, a hybrid fiber coax network, a wireless network (e.g. a Wi-Fi and/or mobile telephone network), a satellite network, a wireless broadcast network (e.g., a satellite media broadcasting network or terrestrial broadcasting network), a subscriber television network, a provider-specific network, the Internet, an intranet, local area network, any other suitable network, and/or any combination or sub-combination of these networks.

In an embodiment of the present invention, the user navigation through the EPG is monitored and reported to the database 130 over the communications network 120. For example, a user of a client device 110 may perform the following actions within a same session: access the homepage of the EPG (screen 1); access the VOD catalog (screen 2); go back to the homepage (screen 1); access a list showing the TV programs currently being broadcast on different TV channels (screen 3); and exit the EPG by selecting one of the current TV programs. In such a case, data—comprising an identifier and a timestamp—relevant to each screen viewed by the user are reported and stored in the database 130:

(1) screen 1, timestamp 1;
(2) screen 2, timestamp 2;
(3) screen 1, timestamp 3; and
(4) screen 3, timestamp 4.

The database 130 is therefore able to receive and store different navigation session data from the different client devices 110 of FIG. 1. The database 130 is further operable to process the received data to: calculate a number of views for each screen of the EPG; identify, for each screen of the EPG, the previous and next screens viewed by the user(s); calculate, for each screen of the EPG, a number of views for each previous and next screens; and calculate an average time spent by the users on each screen of the EPG.

The computing device 140 may be comprised in any device with computing power which operates appropriate software. For example, and without limiting the generality of the foregoing, the computing device 140 may comprise a desktop computer, a tablet computer, a handheld device, or other appropriate system operable to query the database 130 and generate a graphical user interface (GUI) representing the navigation flows within the EPG. The computing device 140 may further comprise or be associated with a display device operable to render the generated GUI.

Lastly, the computing device 140 provides an interface enabling an operator such as an administrator of the TV broadcaster, or an EPG designer, etc.) to communicate with the computing device 140. The computing device 140 may receive operator's inputs defining and selecting which GUI to generate and display. For example, but not limited to, an operator may decide to generate a GUI showing the navigation flows for one screen of the EPG. Alternatively and/or in addition, the operator may decide to generate a GUI showing the navigation flows for several or all screens of the EPG. The GUI may be therefore be generated and displayed by the computing device 140 The operator may further interact with the computing device 140 to generate a new GUI and/or update the currently displayed GUI. In any case, the new and/or updated GUI is generated and displayed to that the operator may visualize it and therefore understand how the different screens of the EPG are navigated, browsed, accessed, etc.; identify the most common paths to reach a specific screen; or identify flaws in the EPG design such as a screen not being accessed; etc. Having this understanding is particularly useful for the operator to take further actions. For example, but not limited to, the operator may then decide to modify the architecture of the EPG, select the most relevant screens (e.g. the most viewed screens) to promote content(s), determine a pricing scheme for advertisers, etc.

Figure 2:
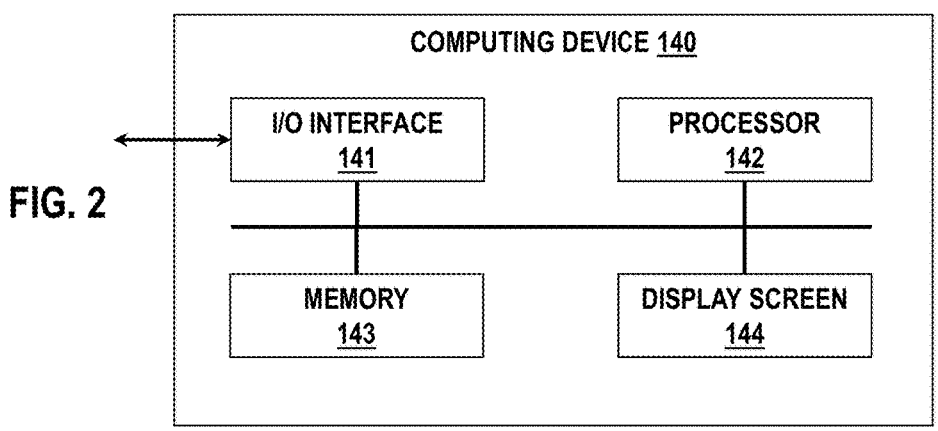
FIG. 2 is a simplified block diagram illustration of the computing device of FIG. 1, constructed and operative in accordance with an embodiment of the present invention.

Reference is now made to FIG. 2, which is a simplified block diagram illustration of the computing device 140 of FIG. 1, constructed and operative in accordance with an embodiment of the present invention. The computing device 140 includes at least an input/output (I/O) interface 141, at least one processor 142, a memory 143 and a display screen 144.

The computing device 140 comprises at least one processor 142 and may comprise more than one processor 142. One of the processors 142 may be a special purpose graphics processor operative to generate and display the GUI representing the navigation flows within the EPG.

The computing device 140 comprises non-transitory computer-readable storage media (i.e. memory) 143. The memory 143 may store instructions, which the at least one processor 142 may execute, in order to generate and display the GUI described herein. The computing device may also comprise a storage unit (not shown), which is to say long term memory, such as, and without limiting the generality of the foregoing, a hard disk drive, flash memory, or other appropriate media for long term storage of data.

The at least one processor 142 is also in communication with the database 130 via the input/output (I/O) communications interface 141. The I/O interface 141 may be any suitable communication interface enabling the computing device 140 to communicate with the database 130. The I/O interface 141 further enables the computing device 140 to communicate with an operator (e.g. a TV broadcaster administrator, an EPG designer, etc.). The operator may use any appropriate pointing methods as are known in the art (e.g., but not limited to: mice, eye tracking methods, direct manipulation by the operator's finger on a display screen 144 associated with the computing device 140) to communicate with the computing device 140 and/or interacts with the GUI rendered on the display screen 144 associated with the computing device 140.

The computing device 140 may also comprise and/or be associated with a display screen 144 operable to display the generated GUI and receive input signals from the operator.

Figure 3:
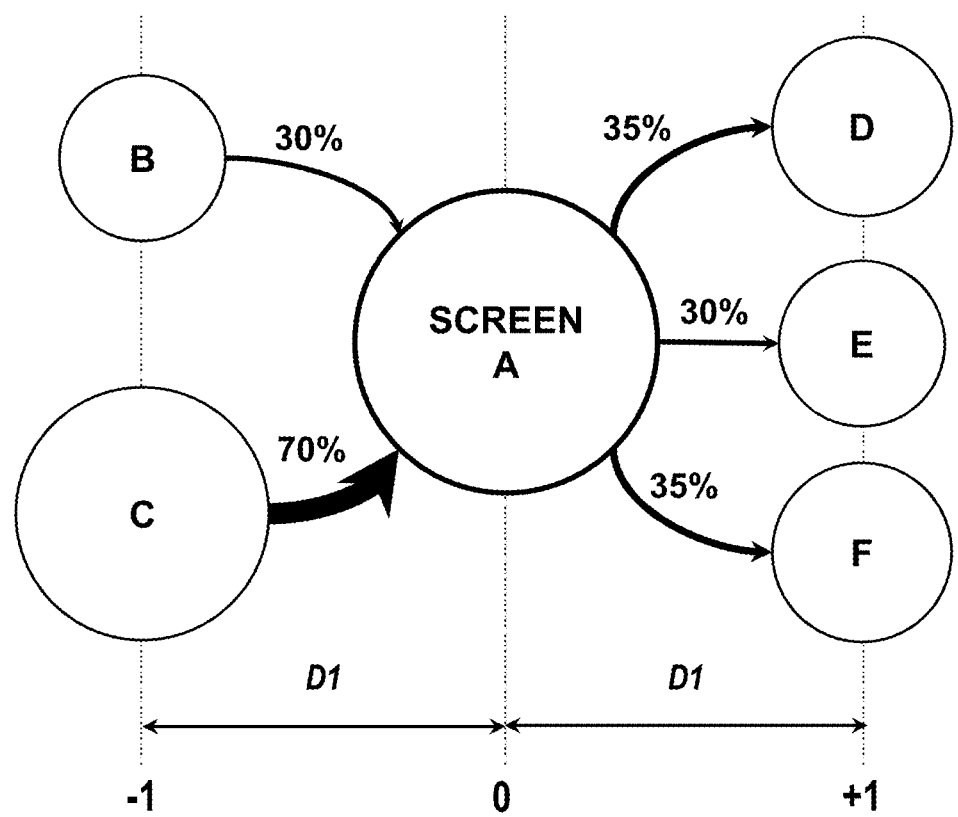
FIG. 3 is a simplified pictorial illustration of a graphical user interface showing different navigational flows for a first screen, constructed and operative in accordance with an embodiment of the present invention.

Reference is now made to FIG. 3, which is a simplified pictorial illustration of a GUI representing different navigation flows for a first screen of the EPG, constructed and operative in accordance with an embodiment of the present invention. The GUI is centered on a specific screen of the EPG, namely 'Screen A', which corresponds to the screen selected by the operator. Screens B and C correspond to screens accessed/visited prior to screen A by the users of the EPG. In other words, some users viewed screen B prior to accessing screen A while other users viewed screen C prior to accessing screen A. Similarly, screens D, E and F correspond to screens accessed/visited after screen A. In other words, the users who viewed screen A accessed either screens D, E or F straight afterwards.

Each screen is represented as a node in FIG. 3. The different nodes may represent any screen of an EPG such as for example, but not limited to, a homepage, a VOD portal, a library of recorded programs, etc. Additionally, a node may represent an entry point and/or an exit point of the EPG. Although represented as having a circular shape, those skilled in the art will appreciate that any suitable shape may be used to represent a node. Nodes representing screens accessed prior to the selected screen (i.e. nodes B and C) are placed on the left hand side of the node representing the selected screen (node A). Similarly, the nodes representing screens accessed next after the selected screen (nodes D, E and F) are placed on the right hand side of the node representing the selected screen (node A). Although this configuration is consistent with the traditional way of representing a movement in time along a timeline, those skilled in the art will appreciate that any other suitable configuration (e.g. previous nodes on the right and next nodes on the left, previous nodes on the bottom and next nodes on top, etc.) may be used. Additionally, the nodes representing the screens accessed prior to/next after may be placed at a same configurable distance D1 from the selected node (node A). Keeping a same distance enables the operator to visually understand that nodes B and C and nodes D, E and F are at a same level relative to the selected node, that is to say, respectively one screen prior to and one screen after the selected screen.

Furthermore, the size of the node representing the selected screen (node A) is proportional to the total number of users who viewed the selected screen. In addition, the sizes of the previous nodes B and C are proportional to the volume of flows between these nodes and the node representing the selected screen (node A). FIG. 3 shows that 30% of the users that visited screen A came from screen B and that the remaining 70% came from screen C. Therefore, the size of previous node B represents 30% of the size of selected node A and the size of previous node C represents 70% of the size of selected node A. Similarly, the sizes of next nodes D, E and F are proportional to the volume of flows between these nodes and the node representing the selected screen (node A). FIG. 3 shows that: 35% of the users that visited screen A went to screen D; 30% went to screen E; and the remaining 35% went to screen F. Therefore, the sizes of next nodes D and F represent 35% of the size of selected node A and the size of next node E represents 30% of the size of selected node A. Such a representation gives the operator a visual overview of the volume of flows between the nodes.

FIG. 3 also shows arrows connecting the different nodes. The direction of the arrows indicates the direction of navigation between the previous, the selected and the next nodes. Therefore, arrows connecting the previous nodes B and C and the selected node A point towards the selected node A while arrows connecting the selected node A to the next nodes D, E and F point towards the next nodes D, E and F. In addition, the width of the different arrows may be proportional to the volume of flows between the nodes. For example, a default configurable width representing a particular volume of flows between two nodes may be defined and used as a basis for determining the width of the different arrows. Additionally, real values for the volume of flows between each node may be provided and displayed in the generated GUI as illustrated in FIG. 3. Although represented as arrows, those skilled in the art will appreciate that any suitable connector may be used to connect two nodes of the GUI as long as a direction of navigation and a volume of flows may be represented.

Figure 4:
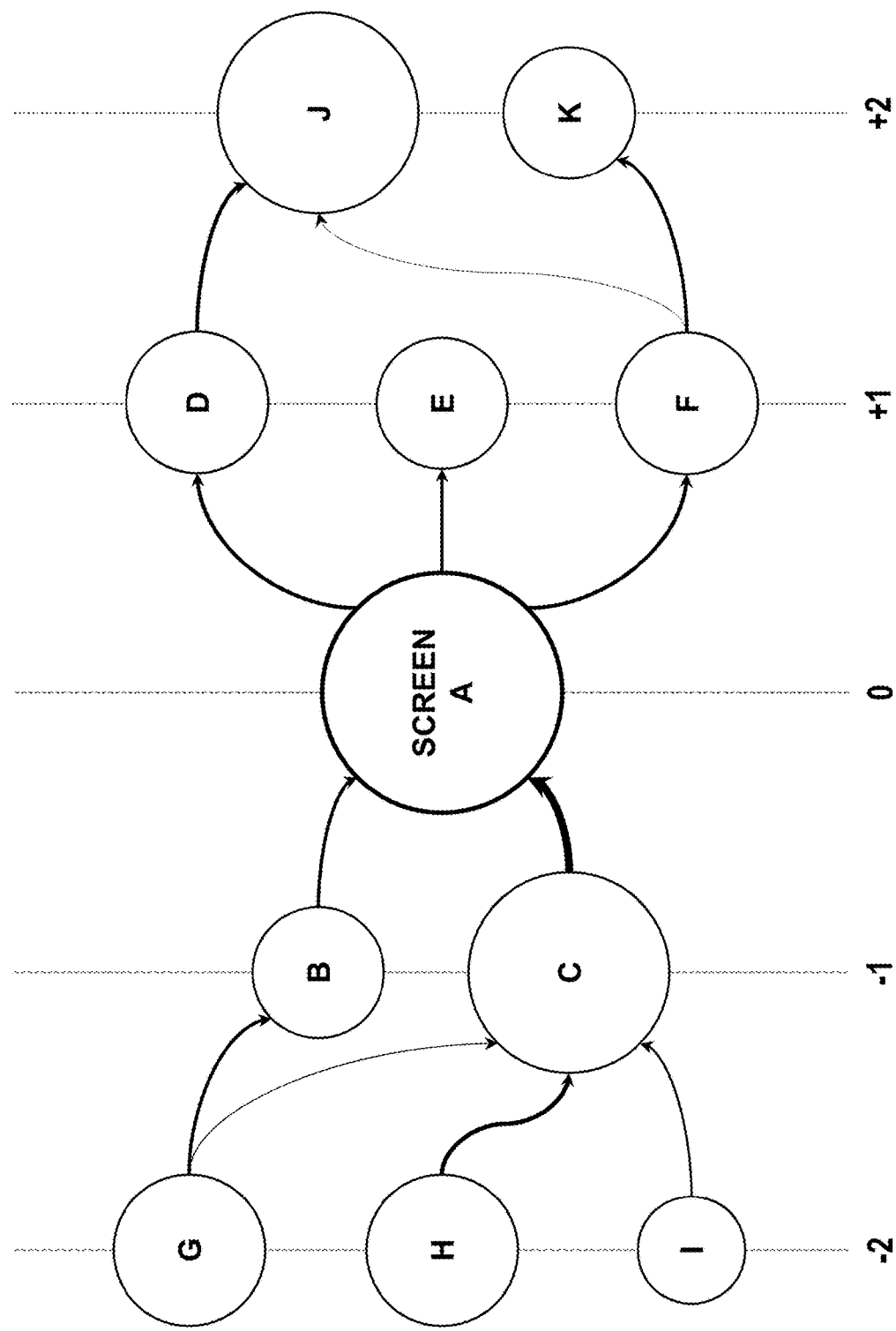
FIG. 4 is a simplified pictorial illustration of a graphical user interface showing different navigational flows for the first screen, constructed and operative in accordance with another embodiment of the present invention.

Reference is now made to FIG. 4, which is a simplified pictorial illustration of a GUI showing different navigational flows for the first screen, constructed and operative in accordance with another embodiment of the present invention. This GUI is similar to the one shown in FIG. 3 but adds one additional level of navigation. In FIG. 4, the nodes A to F are the same as the ones shown in FIG. 3 with previous nodes B and C being placed at level −1 and next nodes D, E and F being placed at level +1. This GUI is also centered on the selected node A which corresponds to the screen selected by the operator. Additional nodes are depicted and placed at levels −2 and +2.

Three nodes G, H and I are shown at level −2 in FIG. 4. These nodes represent screens accessed/visited by users of the EPG prior to visiting one of the screens represented by nodes B and C at level −1 and then, visiting screen A. It is therefore apparent from FIG. 4 that the users that were on screen G went to screen A either via screen B or screen C. On the contrary, all the users that were on screens H and I went to screen A via screen C. Nodes of level −2 are placed on the left relative to nodes of level −1. The distance D1 of FIG. 3 or a different configurable distance may be used between levels −2 and −1.

Two nodes J and K are shown at level +2 in FIG. 4. These nodes represent screens accessed/visited by users of the EPG that visited screens D, E and F at level +1 next after visiting screen A. It is therefore apparent from FIG. 4 that all the users that visited screen D after screen A went to screen J. Also, the users that visited screen F next after screen A went to either screen J or screen K.

As explained in relation to FIG. 3, the size of the node A is proportional to the total number of users who accessed/visited the selected screen. Also, the sizes of the previous and next nodes (i.e. nodes placed at levels +1 and −1) are proportional to the volume of flows between these nodes and the node representing the selected screen. Consequently, the total combined surface area of nodes belonging to a same level equals to the surface of the selected node. For example, the total combined surface area of nodes B and C (level −1) is equal to the surface of node A. Similarly, the total combined surface area of nodes G, H and I (level −2) is equal to the surface of node A. This is also the case for the nodes at levels +1 and +2. Those skilled in the art will appreciate that other ways of setting the sizes of the nodes may be used as long as the operator has a visual cue of the proportional differences (i.e. volume of flows) between the nodes.

FIG. 4 also shows arrows connecting the different nodes. As explained hereinabove in relation to FIG. 3, the direction of the arrows indicates the direction of navigation between the nodes and the width of the different arrows may be proportional to the volume of flow between the nodes.

It will be apparent to those skilled in the art that although only two levels are depicted in FIG. 4, a configurable number of levels may be displayed. The operator may interact with the computing device 140 to define a particular number of levels to use for generating and displaying the GUI. For example, but not limited to, the operator may want to see the navigation flows for: three levels prior to and next after the selected screen; or two levels prior to and three levels next after the selected screen; etc.

Figure 5:
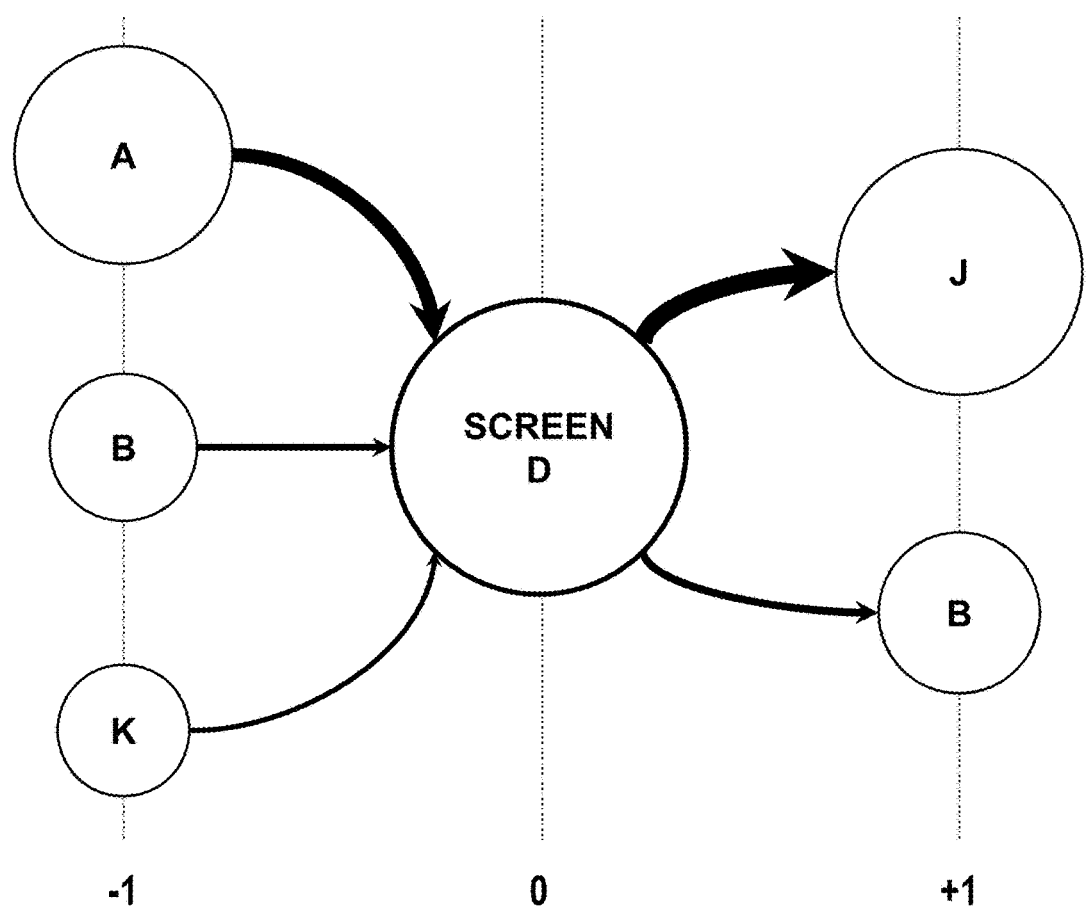
FIG. 5 is a simplified pictorial illustration of a graphical user interface showing different navigational flows for a second screen, constructed and operative in accordance with an embodiment of the present invention.

Reference is now made to FIG. 5, which is a simplified pictorial illustration of a GUI showing different navigational flows for a second screen, constructed and operative in accordance with an embodiment of the present invention. FIG. 5 shows a second screen selected by the operator (screen D). This may be achieved either by the operator defining the screen D as the selected screen for generating and displaying a GUI or as a result of an input signal input by the operator on the displayed GUI of FIG. 4. For example, while viewing the GUI of FIG. 4, the user may decide that he wants to understand how screen D is accessed/ visited. Therefore, the operator may interact with the GUI of FIG. 4 to select the node representing screen D. As a result, a new GUI centered on node D is generated and rendered on the display screen 144 of the computing device 140.

FIG. 5 shows three previous nodes A, B and K and two next nodes J and B. It will be apparent to those skilled in the art that the principles explained in relation to FIGS. 3 and 4 for representing the different elements of the GUI (i.e. shapes, levels, arrows, distance, etc.) are the same for FIG. 5 and therefore are not repeated hereinafter. However, FIG. 5 shows that the node representing the screen B may appear at different levels. Indeed, screen B is represented as a previous node at level −1 and a next node at level +1. This typically corresponds to a loop that is to say that some users that were on screen B went to screen D and then came back to screen B. Therefore, a node representing a same screen may appear at different levels in the GUI in order to maintain the direction of navigation.

Figure 6:
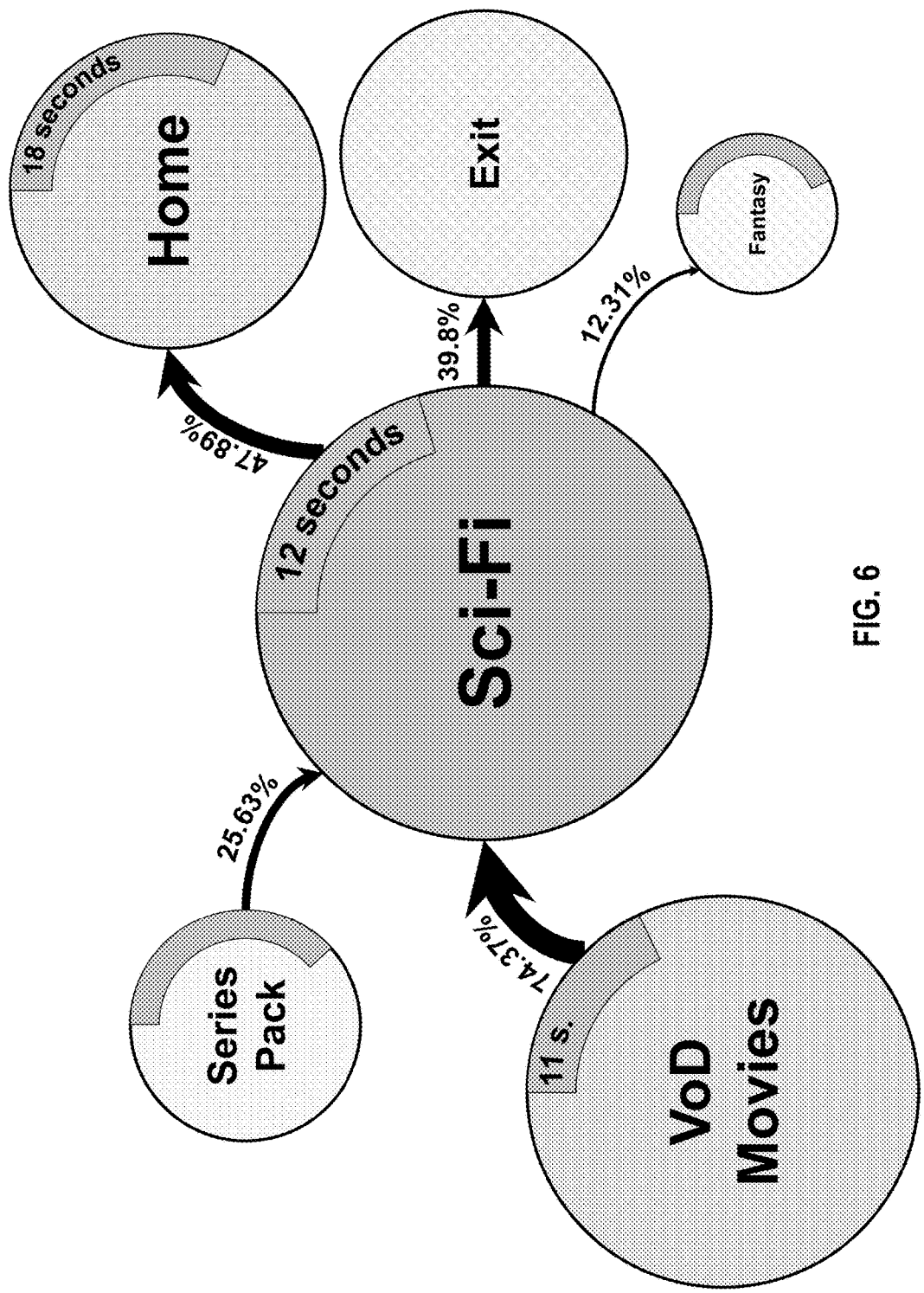
FIG. 6 is a simplified pictorial illustration of a graphical user interface showing different navigational flows for a third screen, constructed and operative in accordance with an embodiment of the present invention.

Reference is now made to FIG. 6, which is a simplified pictorial illustration of a GUI showing different navigational flows for a third screen, constructed and operative in accordance with an embodiment of the present invention. The GUI of FIG. 6 shows different nodes representing different screens of an EPG. Each node comprises an identifier thereby enabling the operator to identify which screens of the EPG are currently represented in the GUI. This identifier may be provided as textual data although it will be apparent to those skilled in the art that any other suitable identifier may be used. FIG. 6 depicts six nodes comprising textual data identifying five screens of an EPG (e.g. series pack, VOD movies, Sci-Fi, home and fantasy) and one exit point (e.g. Exit). Some of the users that were on the 'Sci-Fi' screen may have selected a 'Sci-Fi' program for viewing. As a result of the operation, the selected 'Sci-Fi' program may be started and the EPG closed. Therefore, the 'Exit' node shown in FIG. 6 represents this particular EPG navigation event.

Those skilled in the art will appreciate that most of the principles explained in relation to FIGS. 3, 4 and 5 for representing the different elements of the GUI (i.e. shapes, levels, arrows, etc.) are the same for FIG. 6 and therefore are not repeated hereinafter. Additionally, in FIG. 6, each node may comprise a visual indication specifying an average time spent on a screen. Such a visual indication is represented as an arc starting from the top of the node and following the peripheral border of the node in a clockwise direction. Using an arc representation is particularly useful because of the analogy with an analog clock.

The width of the arc may be defined as a percentage of the diameter of the node. For example, a default configurable width representing a particular percentage of the diameter of a node such as for example, but not limited to, 10%, may be selected and used as a basis for determining the width of the different arcs.

The length of the arc represents the average time spent on a particular screen. The time unit and time scale used for representing the arcs may depend on the context but have to be consistent across all nodes of a same GUI. Keeping a same time unit and time scale for a generated GUI enables the operator to visually compare the arcs of the different nodes. The time unit used for the arcs, and therefore, used to express the different average times spent on the different screens, may be seconds, minutes or hours. The time scale used for the arcs, and therefore, used to determine the length of the different arcs, corresponds to a duration associated with the circumference of the nodes and is freely configurable by the operator. Non-limiting examples of durations used as the time scale comprise thirty seconds, sixty seconds, ten minutes, sixty minutes, twelve hours, etc.

In FIG. 6, the selected time unit is seconds and the selected time scale is sixty seconds for all the different nodes. Therefore, the lengths of the different arcs are determined and represented accordingly. The operator may select a default particular time unit and a default time scale to be used for the GUI. Alternatively and/or additionally, the time units and time scales may be selected automatically by the computing device 140 at the time when the GUI is to be generated. To do so, display rules may be defined and applied at the time when the computing device 140 is generating the GUI. The display rules enable the computing device 140 to select a relevant time unit and time scale depending on the maximum average time spent on a screen. When the data are received from the database 130, the computing device 140 is operative to determine the maximum average time spent on a screen and apply the display rules. Non-limiting examples of display rules comprises using one or more of the following (time unit; time scale) pair:
  (seconds; 30 seconds) when the maximum average time is equal or less than 30 seconds;
  (seconds; 60 seconds) when the maximum average time is equal or less than 60 seconds and more than 30 seconds;
  (minutes; 10 minutes) when the maximum average time is equal or less than 10 minutes and more than 60 seconds;
  (minutes; 60 minutes) when the maximum average time is equal or less than 60 minutes and more than 10 minutes; and
  (hours; 12 hours) when the maximum average time is equal or less than 12 hours and more than 60 minutes.
In FIG. 6, the maximum average time spent on a screen across all nodes that have to be displayed within the GUI is under thirty seconds. By applying the display rules described hereinabove, the selected time unit is seconds and the selected time scale is sixty seconds.

Additionally, the arcs may comprise timing information indicating the average time spent on a screen. Displaying such timing information makes it easier for the operator to compare the different average times for the different nodes. However, since the widths of the arcs depend on the sizes of the nodes and the lengths depend on the average times spent on a screen as well as the unit of times and time scales selected for generating the GUI, it might not be possible to display the timing information in some situations. Therefore, when generating the GUI, the size and/or the type of timing information displayed may be adjusted so that the timing information fits into the available width and/or length of an arc.

Adjusting the timing information may comprise, for example, but not limited to, one or more of the following: decreasing the size of the font used for displaying the timing information, displaying only an abbreviation for the selected time unit, etc. FIG. 6 shows three nodes for which timing information is displayed and/or adjusted: a first font size is used for the timing information of the 'Sci-Fi' node; a second font size is used for the timing information of the 'Home' node; and a third font size as well as an abbreviation is used for the timing information of the 'VOD movies' node. Alternatively and/or additionally, the timing information may not be displayed for some nodes in order to not overload the GUI. This is the case in FIG. 6 for the 'Series Pack' and the 'Fantasy' nodes. Although not displayed, this timing information may remain available and displayed, for example, but not limited to, at the time when the operator selects the node, moves a cursor over the node, etc. Also, it will be appreciated by those skilled in the art that the timing information is not displayed for nodes representing an exit point and/or an entry point.

Furthermore, FIG. 6 shows different shades of grey used as background colors to fill the nodes. In one embodiment of the present invention, different shades of a same color may be used as background colors for the nodes. These different shades of the same color give the operator a further indication relevant to the volume of flows between the different nodes displayed within the GUI. For example, a particular color may be selected for the selected node (i.e. the 'Sci-Fi' node in FIG. 6) and different shades of the particular color may be obtained by adjusting the transparency parameter according to the volume of flows between the different nodes and the selected node. For example, the transparency parameter of a particular node (other than the selected node) may be set to a value which is proportional or inversely proportional to a volume of flow between the particular node and the selected node. In another example, a color gradient may be used for filling the different nodes with a background color. The color gradient specifies: a first color representing 100% of the volume of flow and therefore, used as background color for the selected node (e.g. dark blue); a second color representing 0% of the volume of flow (e.g. light blue); and intermediate colors for intermediate percentages. Then, the background colors for the different nodes (other than the selected node) are calculated using linear interpolation according to the volume of flows between the different nodes and the selected node.

Additionally and/or alternatively, different colors may be used for the different levels of the GUI. As a result, the darker a node is, the bigger the volume of flow. This gives the operator a visual overview of the most common navigation paths followed by the users prior to and after a particular screen of the EPG. For example, in FIG. 6, the darkest node before the 'Sci-Fi' selected node is the 'VOD movies' nodes and the darkest node after the 'Sci-Fi' selected node is the 'Home' nodes. Therefore, the operator will understand that most of the users: accessed the 'Sci-Fi' screen from the VOD portal screen; and left the 'Sci-Fi' screen to go back to the EPG homepage.

Figure 7:
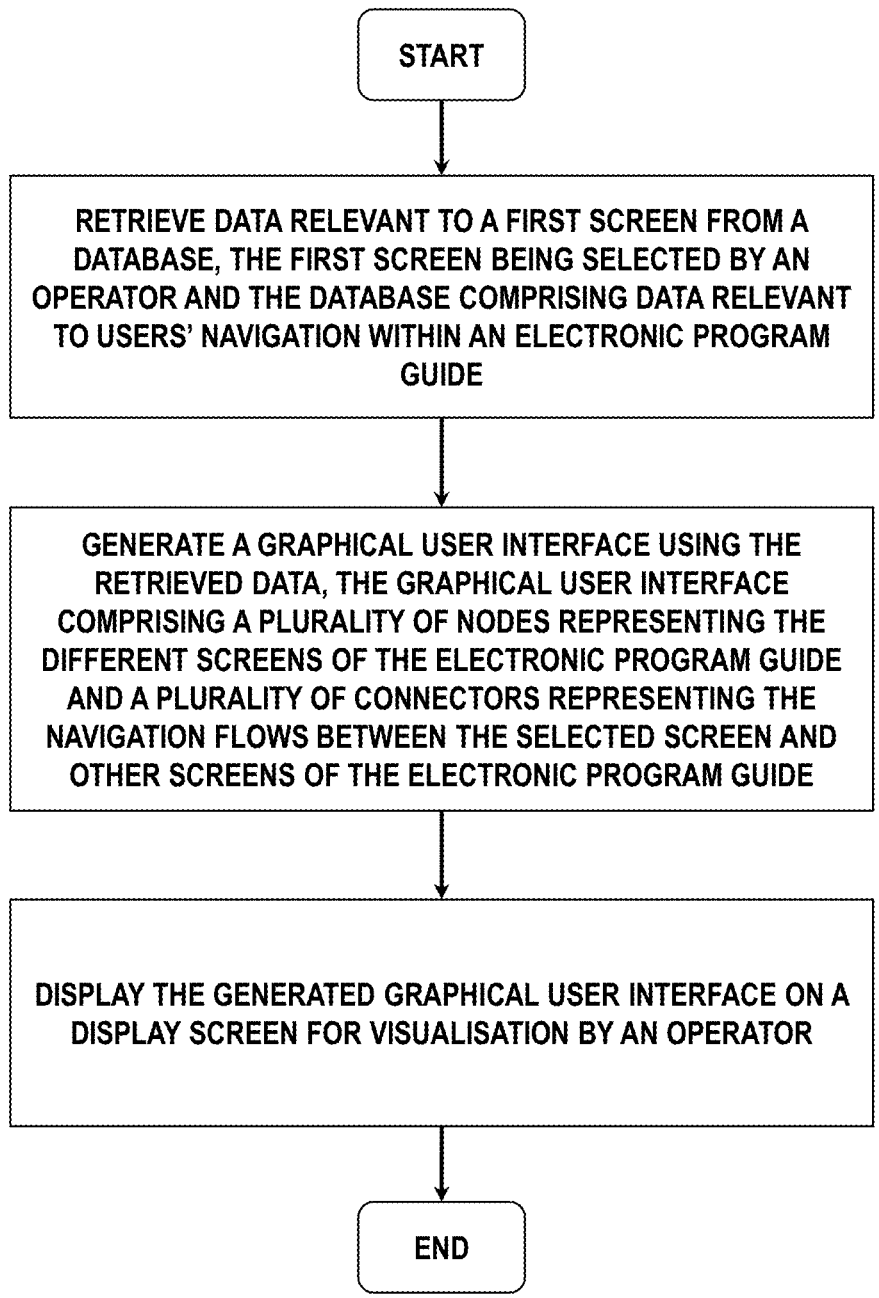
FIG. 7 is a simplified flow chart diagram illustrating a method for displaying the graphical user interface in accordance with an embodiment of the present invention.

Reference is now made to FIG. 7, which is a simplified flow chart diagram illustrating a method for displaying the graphical user interface in accordance with an embodiment of the present invention. FIG. 7 is believed to be self-explanatory in light of the above discussion.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented on a computing device for visualizing navigation flows within an electronic program guide, said method comprising:
   retrieving data relevant to a first screen of said electronic program guide, said data identifying a plurality of screens viewed by users of said electronic program guide prior to and/or after said first screen and a volume of navigation flow between each of said plurality of screens and said first screen;
   generating a graphical user interface using said retrieved data, said graphical user interface comprising a plurality of nodes and a plurality of connectors, in which:
      a first node of said plurality of nodes identifies said first screen;
      one or more second nodes of said plurality of nodes identify one or more second screens accessed after said first screen, each of said one or more second nodes being positioned to one side of said first node;
      said first node is filled with a first background color, and each of said one or more second nodes is filled with a secondary background color from a range of secondary background colors, wherein said range of secondary background colors is derived as a function of at least said first background color and indicates a volume of navigation flow going from said first node to said one or more second nodes;
      said first node is connected to each of said one or more second nodes by one of said plurality of connectors, each of said plurality of connectors pointing towards each of said one or more second nodes and having a width proportional to a volume of navigation flow received by each of said one or more second nodes from said first node;
      wherein at least one of said plurality of nodes comprises a visual indication, said visual indication indicating an average time spent by said users on an identified screen of said electronic program guide; and
   rendering said generated graphical user interface on a display screen of said computing device.

2. The method of claim 1, wherein said generated graphical user interface further comprises:
   one or more third nodes of said plurality of nodes identifying one or more third screens accessed prior to accessing said first screen, each of said one or more third nodes being positioned to another side of said first node; and
   said first node is connected to each of said one or more third nodes by one of said plurality of connectors, each of said plurality of connectors pointing towards said first node and having a width proportional to a volume of navigation flow going from each of said one or more third nodes to said first node.

3. The method of claim 2, wherein said first node has a size proportional to a number of views of said first screen; said one or more second nodes have a size proportional to a volume of navigation flow received from said first node; and said one or more third nodes have a size proportional to a volume of navigation flow going to said first node.

4. The method of claim 2, wherein at least one of said one or more second nodes and at least one of said one or more third nodes corresponds to a same identified screen.

5. The method of claim 2, wherein said one or more second nodes identify one or more second screens accessed next after said first screen, each of said one or more second nodes being positioned to the right side of said first node at a same distance from said first node; and wherein said one or more third nodes identify one or more third screens accessed prior to said first screen, each of said one or more third nodes being positioned to the left side of said first node at said same distance from said first node.

6. The method of claim 2, wherein at least one of said one or more third nodes corresponds to an entry point of said electronic program guide and/or at least one of said one or more second nodes corresponds to an exit point of said electronic program guide.

7. The method of claim 2, wherein each of said plurality of nodes has a circular shape and said visual indication is an arc positioned along the peripheral border of said at least one of said plurality of nodes.

8. The method of claim 1, wherein said range of secondary background colors are different shades of said first background color.

9. The method of claim 8, wherein said different shades of said first background color are obtained by adjusting a transparency parameter of said first background color according to a volume of flow between said first node and each of said one or more second nodes.

10. The method of claim 9, wherein said transparency parameter is proportional or inversely proportional to a volume of flow between said first node and each of said one or more second nodes.

11. The method of claim 2, wherein:
a second background color is specified;
said range of secondary colors are intermediate colors from a color gradient defined between said first and second background colors; and
said intermediate colors are used to fill each of said one or more second and third nodes.

12. The method of claim 11, wherein said intermediate colors are calculated using linear interpolation according to volume of flows between said first node and said one or more second and third nodes.

13. The method of claim 1, further comprising:
using said generated graphical user interface rendered on a display screen associated with said computing device to improve a screen arrangement of said electronic program guide.

14. A computing device for visualizing navigation flows within an electronic program guide, said computing device comprising:
a processor operable to:
retrieve data relevant to a first screen of said electronic program guide, said data identifying a plurality of screens viewed by users of said electronic program guide prior to and/or after said first screen and a volume of navigation flow between each of said plurality of screens and said first screen;
generate a graphical user interface using said retrieved data, said graphical user interface comprising a plurality of nodes and a plurality of connectors, in which:
a first node of said plurality of nodes identifies said first screen;
one or more second nodes of said plurality of nodes identify one or more second screens accessed after said first screen, each of said one or more second nodes being positioned on one side of said first node;
said first node is filled with a first background color, and each of said one or more second nodes is filled with a secondary background color from a range of secondary background colors, wherein said range of secondary background colors is derived as a function of at least said first background color and indicates a volume of navigation flow going from said first node to said one or more second nodes;
said first node is connected to each of said one or more second nodes by one of said plurality of connectors, each of said plurality of connectors pointing towards each of said one or more second nodes and having a width proportional to a volume of navigation flow received by each of said one or more second nodes from said first node;
wherein at least one of said plurality of nodes comprises a visual indication, said visual indication indicating an average time spent by said users on an identified screen of said electronic program guide; and
a display screen operable to render said generated graphical user interface.

15. The computing device of claim 14, wherein said graphical user interface generated by said processor further comprises:
one or more third nodes of said plurality of nodes identify one or more third screens accessed prior to accessing said first screen, each of said one or more third nodes being positioned to another side of said first node; and
said first node is connected to each of said one or more third nodes by one of said plurality of connectors, each of said plurality of connectors pointing towards said first node and having a width proportional to a volume of navigation flow going from each of said one or more third nodes to said first node.

16. A method implemented on a computing device for visualizing navigation flows within an electronic program guide, said method comprising:
retrieving data relevant to a first screen of said electronic program guide, said data identifying a plurality of screens viewed by users of said electronic program guide prior to and/or after said first screen and a volume of navigation flow between each of said plurality of screens and said first screen;
generating a graphical user interface using said retrieved data, said graphical user interface comprising a plurality of nodes and a plurality of connectors, in which:
a first node of said plurality of nodes identifies said first screen;
one or more second nodes of said plurality of nodes identify one or more second screens accessed after said first screen, each of said one or more second nodes being positioned to one side of said first node;
said first node is connected to each of said one or more second nodes by one of said plurality of connectors, each of said plurality of connectors pointing towards each of said one or more second nodes and having a width proportional to a volume of navigation flow received by each of said one or more second nodes from said first node;

wherein at least one of said plurality of nodes comprises a visual indication, said visual indication indicating an average time spent by said users on an identified screen of said electronic program guide, and wherein each of said plurality of nodes has a circular shape and said visual indication is an arc positioned along a peripheral border of said at least one of said plurality of nodes; and rendering said generated graphical user interface on a display screen of said computing device.

17. The method of claim 16, wherein a same duration is associated with the circumferences of each of said plurality of nodes and the length of said arc, representing an average time spent on an identified screen, is adjusted in accordance with said same duration.

18. The method of claim 17, wherein said same duration associated with the circumferences of each of said plurality of nodes is specified by a user of said computing device.

19. The method of claim 17, wherein said same duration associated with the circumferences of each of said plurality of nodes is defined in accordance with a maximum average time spent by users on one of said plurality of screens, said maximum average time being retrieved as part of said data relevant to said first screen.

20. The method of claim 19, wherein said same duration is set to at least one of the following:
- thirty seconds when said maximum average time is equal or less than thirty seconds;
- sixty seconds when said maximum average time is equal or less than sixty seconds and more than thirty seconds;
- ten minutes when said maximum average time is equal or less than ten minutes and more than sixty seconds;
- sixty minutes when said maximum average time is equal or less than sixty minutes and more than ten minutes; or
- twelve hours when said maximum average time is equal or less than twelve hours and more than sixty minutes.

* * * * *